(12) United States Patent
Jarsch

(10) Patent No.: US 12,371,116 B2
(45) Date of Patent: Jul. 29, 2025

(54) VEHICLE FOR A CONVEYOR SYSTEM AND METHOD FOR SIMULTANEOUSLY TRANSPORTING WORKPIECES AND WORKERS

(71) Applicant: EISENMANN GMBH, Böblingen (DE)

(72) Inventor: Stefan Jarsch, Waldenbuch (DE)

(73) Assignee: Eisenmann GMBH, Böblingen (DE)

( * ) Notice: Subject to any disclaimer, the term of this patent is extended or adjusted under 35 U.S.C. 154(b) by 536 days.

(21) Appl. No.: 17/773,880

(22) PCT Filed: Nov. 4, 2020

(86) PCT No.: PCT/EP2020/081009
§ 371 (c)(1),
(2) Date: May 3, 2022

(87) PCT Pub. No.: WO2021/089650
PCT Pub. Date: May 14, 2021

(65) Prior Publication Data
US 2022/0348278 A1  Nov. 3, 2022

(30) Foreign Application Priority Data
Nov. 5, 2019  (DE) .................. 10 2019 129 801.6

(51) Int. Cl.
*B62D 65/18*  (2006.01)
*G05B 19/418*  (2006.01)

(52) U.S. Cl.
CPC ....... *B62D 65/18* (2013.01); *G05B 19/41895* (2013.01); *G05B 2219/45197* (2013.01)

(58) Field of Classification Search
CPC .............. B62D 65/18; G05B 19/41895; G05B 2219/45197; Y02P 90/02
See application file for complete search history.

(56) References Cited

U.S. PATENT DOCUMENTS 5,091,855 A  2/1992  Umehara et al.
7,102,496 B1 *  9/2006  Ernst, Jr. .......... G08G 1/096725
340/436

(Continued)

FOREIGN PATENT DOCUMENTS

DE  10 2017 103 931  8/2018
WO  2011/053681  5/2011

OTHER PUBLICATIONS

Stimming et al., "Multi-level on-board data fusion for 2D safety enhanced by 3D perception for AGVs," 2015 IEEE International Conference on Intelligent Computer Communication and Processing, dated Sep. 3, 2015, 6 pages.

(Continued)

*Primary Examiner* — Donald J Wallace
(74) *Attorney, Agent, or Firm* — Schroeder Intellectual Property Law Group, LLC

(57) ABSTRACT

A vehicle and conveyor system for simultaneously transporting workpieces and workers, wherein the vehicle has a workpiece receptacle, an assembly platform accessible to workers, its own drive which is designed to drive the vehicle independently of other vehicles of the conveyor system, a contactless route sensor for navigating the vehicle and a control apparatus for controlling the drive, inter alia on the basis of a signal from the route sensor. The vehicle may have a contactless platform sensor for monitoring the assembly platform, wherein the platform sensor is designed to at least temporarily alternatively take over the monitoring of the travel situation of the vehicle or to at least temporarily additionally support the monitoring of the travel situation of the vehicle. A conveyor system having two such vehicles and to a corresponding method is also provided.

14 Claims, 11 Drawing Sheets

(56) References Cited

U.S. PATENT DOCUMENTS

2011/0099788 A1* 5/2011 Kilibarda ................. B66F 7/14
                                                           29/244
2014/0186147 A1   7/2014 Song et al.
2020/0130115 A1   4/2020 Vetter et al.

OTHER PUBLICATIONS

Real-Moreno et al., "Accuracy improvement in 3D laser scanner based on dynamic triangulation for autonomous navigation system," 2017 IEEE 26th International Symposium on Industrial Electronics, dated Jun. 19, 2017, 8 pages.

* cited by examiner

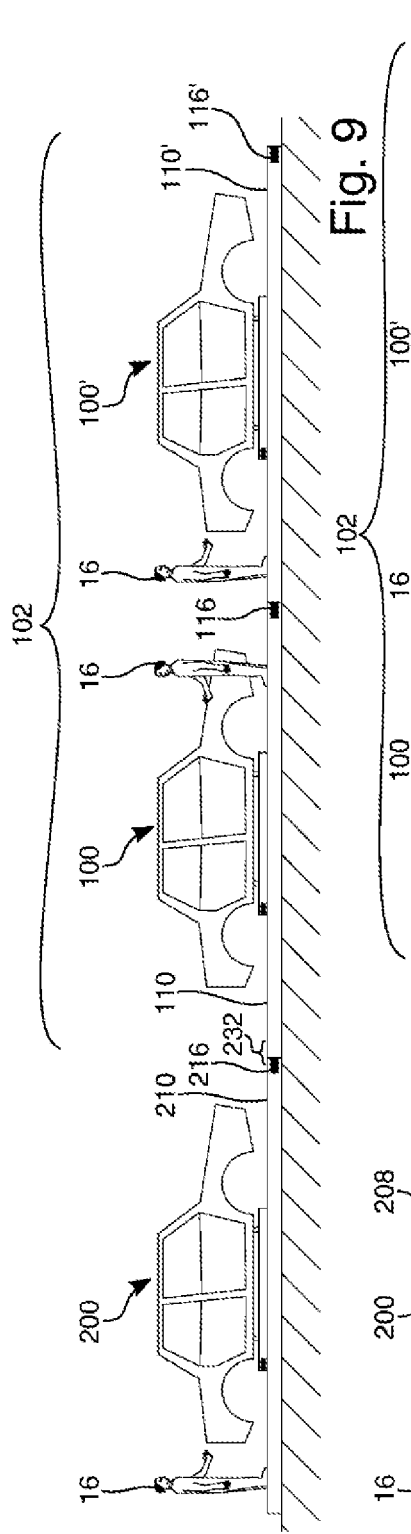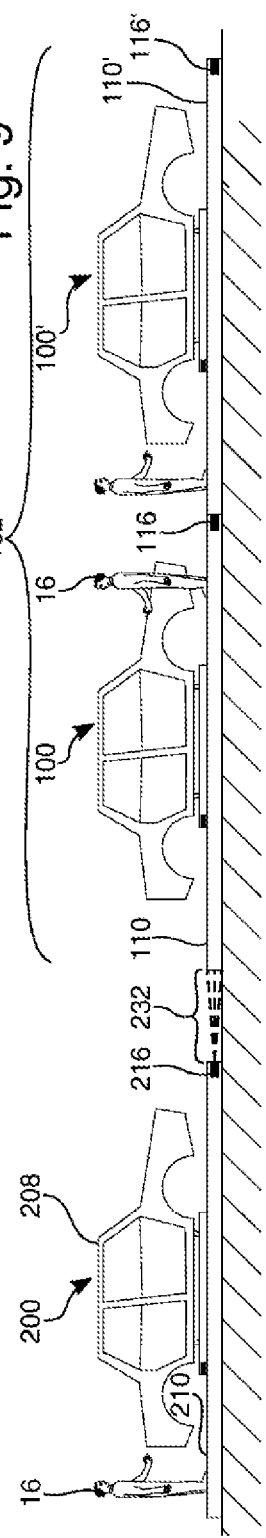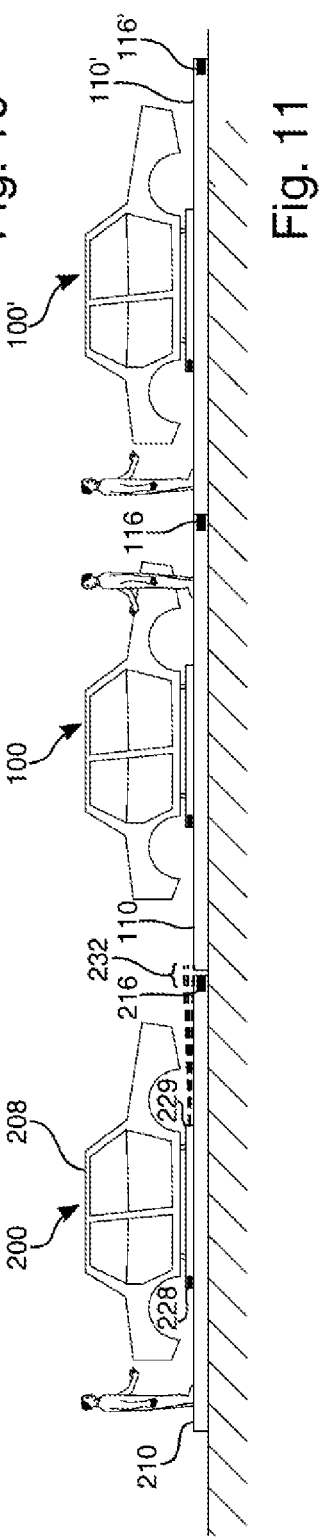

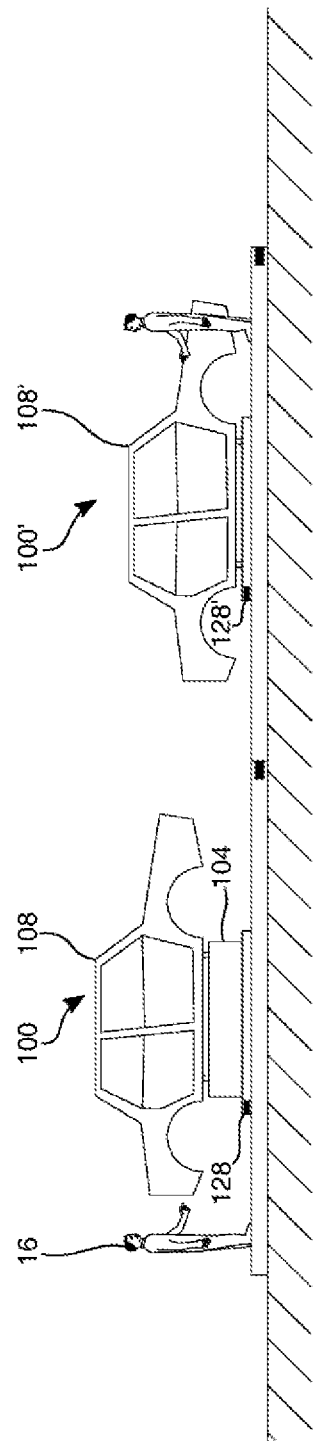
Fig. 12
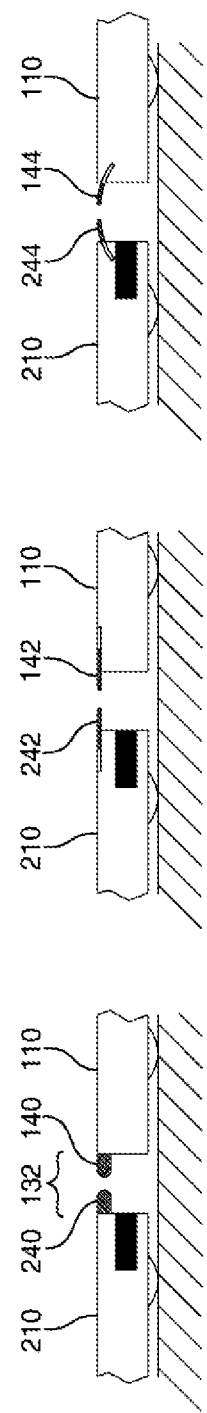
Fig. 13 Fig. 14 Fig. 15
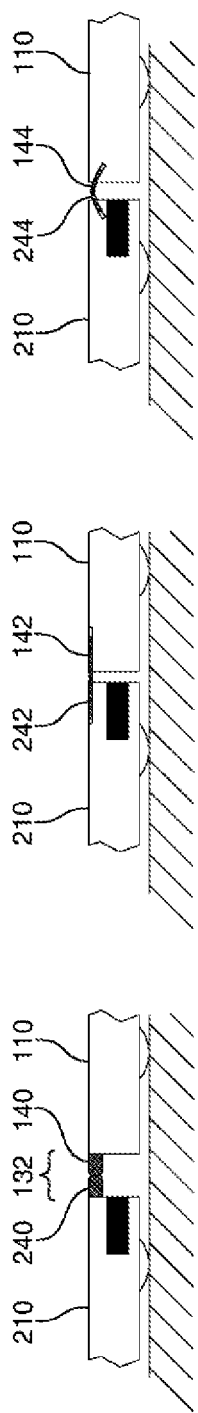
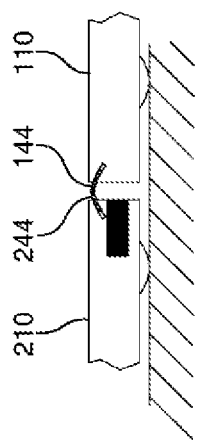

VEHICLE FOR A CONVEYOR SYSTEM AND METHOD FOR SIMULTANEOUSLY TRANSPORTING WORKPIECES AND WORKERS

RELATED APPLICATIONS

This application is a § 371 national phase of International Patent Application No. PCT/EP2020/081009 filed Nov. 4, 2020, which claims priority to and the filing benefit of German Patent Application No. 10 2019 129 801.6 filed Nov. 5, 2019—the contents of both of which are incorporated herein by reference.

BACKGROUND OF THE INVENTION

1. Field of the Invention

The invention relates to a vehicle for a conveyor system for the simultaneous transport of workpieces and workers. Such vehicle systems or conveyor systems are used in particular in the final assembly of motor vehicles, large household appliances or machines that are manufactured in large quantities.

2. Description of the Prior Art

In the final assembly of workpieces, conveyor systems are often used in which the workers can be transported together with the workpieces over a longer period of time. In this way, it is possible for the workers to carry out work on workpieces without having to walk next to the workpieces.

The vehicles in these well-known conveyor systems have a workpiece holder for fastening the workpiece, an assembly platform accessible to the workers and usually a dedicated drive, which is set up to drive the vehicle independently of other vehicles of the conveyor system. Such vehicles also often have a contactless route sensor for pathfinding for the vehicle and a control device for controlling the drive, depending on a signal from the route sensor among other things. During certain production steps, it is advantageous if such vehicles form a vehicle group or a group while transporting workers together with the workpieces. For example, DE 11 2017 113 931 A1 describes a generic conveyor system. Sensors are arranged on the front and side surfaces of the assembly platform for orientation and/or collision avoidance. The sensors are designed, for example, as laser scanners and are used to monitor an area around the vehicles—the safety distance. The safety distance is chosen in such a way that a vehicle can be brought to a stop at a sufficient distance within the safety distance in front of an obstacle that may suddenly appear. The top of the assembly platform is covered by a touch-sensitive floor covering that can be used to detect whether there are workers on the assembly platform.

When forming a vehicle group or a group, it has proven to be problematic that the safety distance provided by the laser scanner for obstacle detection must be maintained. The same applies to an approach of the vehicle to, for example, stationary facilities. At the moment, this can only be done in specially secured areas, as the vehicle cannot then recognize for itself whether a collision is imminent or whether falling below the safety distance is intended.

SUMMARY OF THE INVENTION

It is an object of the invention to specify a vehicle and a method for the simultaneous transport of workpieces and workers, with which the aforementioned disadvantages are at least partially avoided and in particular a vehicle group can be easily formed, preferably without stationary safety devices.

This object is achieved by a vehicle and a conveyor system for the simultaneous transport of workpieces and workers, wherein the vehicle has a workpiece holder, an assembly platform accessible to workers, a dedicated drive, which is equipped to drive the vehicle independently of other vehicles of the conveyor system, a contactless route sensor for finding the path of the vehicle and a control device for controlling the drive inter alia depending on a signal from the route sensor.

According to the invention, it is provided that the vehicle has a contactless platform sensor for monitoring the assembly platform, wherein the platform sensor is set up to alternatively take over the monitoring of the driving situation of the vehicle at least temporarily or additionally to support the monitoring of the driving situation of the vehicle at least temporarily.

It is therefore possible according to the invention, for example in the event of an approach of the vehicle to a second vehicle or to another dynamic or stationary interfering contour, to ensure monitoring of the driving situation of the vehicle with the contactless route sensor up to a certain safety distance which is not to be fallen short of and additionally or alternatively to monitor the driving situation with the contactless platform sensor once this safety distance is fallen short of. While the contactless platform sensor is actually used to monitor the assembly platform and detect the presence of workers in the area monitored by it, it is designed according to the invention to also carry out monitoring of the driving situation of the entire vehicle. This is necessary, for example, if the vehicle has to approach another vehicle or any other interfering contour closer than the actually intended safety distance. If this safety distance is not achieved, it is no longer guaranteed that the vehicle can stop at the given speed and thus avoid a collision in any case. In order to ensure protection against a collision, in particular personal protection, for the remaining distance between the vehicle and the other vehicle or the interfering contour, the platform sensor monitors the driving situation. The same applies in the event of a dissolution of a vehicle group or moving away from an interfering contour. Here it can be relevant, for example, if two vehicles are moving at a higher speed and a person enters the increasing distance between the two vehicles. In this case, too, it may be advisable to monitor the driving situation and, if necessary, to trigger braking or a warning signal.

In a preferred embodiment, it is provided that the takeover of the monitoring of the driving situation or the support of the monitoring of the driving situation by the contactless platform sensor takes place on falling below the safety distance. The takeover or support can already take place at an adequate time interval before the expected falling below the safety distance in order to have the (additional) monitoring of the driving situation by the platform sensor already available if the safety distance is fallen below.

As already explained, the monitoring of the driving situation may include in particular collision avoidance, in particular for the protection of persons. Other aspects relevant to the driving situation can be taken over or supported by the platform sensor. For example, it is conceivable that when the vehicle approaches a second vehicle or another interfering contour, areas are more difficult to detect by the route sensor or the accuracy of the route sensor can be improved by the platform sensor. However, it is particularly preferable to transfer the personal protection to the platform sensor or to additionally carry it out by it. In the present case, personal protection is understood to mean controlling the driving situation of the vehicle in such a way that a danger to workers or other persons who are in the area of the vehicle can be excluded. The procedures to be carried out in the context of personal protection may include, for example, monitoring the speed or direction of the vehicle, the output of audible, visual, or electrical signals or other safety measures.

In a further development of the invention, it may be provided that the platform sensor is set up to adjust its range dynamically or in stages. For example, it may be provided that the platform sensor regularly monitors the walking area on the assembly platform for which it is set up. In the context of an approach to another vehicle or another static or dynamic interfering contour that is expected to penetrate the safety distance provided for the route sensor, the platform sensor can generally or specifically increase its range in the region of the expected approach. If the vehicle is docked to the other vehicle or the interfering contour—i.e. the minimum desired distance (which can also be 0) has been reached—the platform sensor can adjust its range so that at least half the remaining minimum distance is covered. It may also be provided that a platform sensor of one vehicle alone covers the remaining distance and the correspondingly different platform sensor of the other vehicle reduces its range to such an extent that there is no double coverage. If appropriate, double cover may also be desired.

The described dynamic adjustment of the platform sensor can also be carried out for the route sensor.

Until now, it was necessary to use software to actively disregard interfering contours that violate a protective field—i.e. an area defined by the safety distance—when a vehicle is driven by, for example depending on the location. Unforeseen, dynamic interfering contours led to an emergency stop. This emergency stop situation had to be remedied by manual intervention, for example by removing the interfering contour or moving the vehicle. Hiding the interfering contour (muting) had to be done in such a way that "accidental" disregarding of persons is safely excluded.

Instead, it is now proposed to gradually increase or reduce the protective field of the route sensor depending on the actual speed of the vehicle and the associated stopping distance.

Warning fields can be located in front of protective fields. When a warning field detects an interfering contour, it initiates the reduction of the driving speed to the next lower stage. The warning field is dimensioned in such a way that the lower speed is reached before the current protective field is violated and an emergency stop would be triggered.

As a result, when approaching an interfering contour, the vehicle will brake step by step down to the lowest speed with the smallest protective field, without an emergency stop condition being triggered and the vehicle stopping at the interfering contour. Nevertheless, the personal protection function of the route sensor is retained during the entire time. If the speed is not reduced as intended, the associated protective field initiates the emergency stop.

When approaching a bottleneck (especially when cornering, when the protective field protrudes beyond the curve), the vehicle will thus independently reduce its speed, drive past the interfering contour with the reduced protection and warning fields and then, when the warning fields have become free, it accelerates back to the original target speed. Due to this method, no further interventions and no muting (event- or location-dependent controlled disregarding of interfering contours) are required. It is not possible to get stuck on interfering contours that do not protrude into the route. The method works always and everywhere and is not tied to specific places or situations.

Preferably, the route sensor and the platform sensor work in the horizontal. This means that in particular when the route sensor and/or the platform sensor is in the form of a scanner, the orientation of the detected scan area is essentially horizontal. Especially with the route sensor, it must be ensured that, for example, an unconscious person lying on the ground can be detected by it.

Preferably, the detection space of the platform sensor can be set up in such a way that it extends beyond the assembly platform by a safety distance. Preferably, the safety distance by which the detection space of the platform sensor extends beyond the assembly platform correlates with the minimum safety distance of the route sensor, i.e. it coincides with it or is slightly larger than it. In this way, the safety function can be transferred from the chassis sensor to the platform sensor and vice versa without creating a gap in the protected area.

Preferably, the route sensor is designed in such a way that a horizontal cylindrical body of 200 mm in diameter or larger which is lying down can be detected. For this purpose, the route sensor can be designed, for example, as a linear scanner that detects the width of the vehicle or somewhat larger and essentially the horizontal area in front of the vehicle. For this purpose, the route sensor can, for example, work at a height of 150 mm. Alternatively, the orientation of the route sensor may also be tilted downwards. This reduces the maximum range of the route sensor and makes it difficult to evaluate the sensor signal to detect possible obstacles, but may offer improved accuracy at close range.

It is preferred if the platform sensor covers an area above the route sensor. Above can mean that the plane within which the route sensor operates is below the plane within which the platform sensor operates. The vertical distance between the detection level of the platform sensor and the detection level of the route sensor may, for example, be between 50 mm and 250 mm, preferably between 110 mm and 200 mm, particularly preferably at 150 mm. {Cylindrical body of 200 mm height, route sensor is located at 150 mm height, assembly platform level must not be more than 250 mm. Platform sensor is mounted 50 mm higher=>distance between route sensor and platform sensor equal to 150 mm}

The object is also achieved by a conveyor system with at least two vehicles according to one of the preceding examples.

Furthermore, the object is also achieved by a method for controlling such a vehicle, which has the following steps: Monitoring the driving situation of the vehicle with the route sensor; Approaching a second vehicle for the formation of a group, moving away from or increasing the distance from a second vehicle for detachment from a group or an approach by the vehicle to a stationary or moving interfering contour; once the safety distance to the second vehicle or the interfering contour is fallen short of or as long as the second vehicle or the interfering contour is within the safety distance, alternatively or additionally carrying out monitoring of the driving situation with the platform sensor.

In this way, the advantages of the invention are also realized in the context of a method.

Advantageously, the method provides that the monitoring of the driving situation includes collision avoidance, in particular for personal protection.

Advantageously, it may be provided that the platform sensor adjusts its range dynamically or in stages during an approach to another vehicle or an interfering contour or while moving away from a second vehicle or an interfering contour.

In a particularly advantageous embodiment, it is provided that in a group formed of, for example, two vehicles, the route sensor of a vehicle takes over control of the distance from a second vehicle.

It is particularly preferred if the platform sensor takes over the monitoring of the assembly platform and a docking area to a second vehicle.

It is advantageous if the arrangement of the area detected by the route sensor and/or the platform sensor depends on the current driving speed, the position, the load state of a vehicle and/or the distance from another vehicle.

With the present invention, a driverless transport system can be realized, in which the individual vehicles can approach with other vehicles or suitable stationary devices until contact with them occurs. The protection does not require fixed protective devices and can be implemented in particular between moving objects such as the docking of several vehicles to form a group. The protection of the individual vehicles works autonomously without any otherwise necessary secure communication with stationary facilities or other vehicles. Regardless of the location or the system layout, it is reliably detected when people are on the vehicle and dangerous movements of the vehicle are prevented. This can be achieved with a first scanner by ensuring that no person or object is in the danger zone until a safety distance is fallen short of. If the safety distance is fallen short of, the first scanner is deactivated and a second scanner monitors the environment to ensure that no person enters the danger zone.

The electrical or control coupling of individual vehicles to form a group can be realized as follows:

A first vehicle drives in a group at the speed of the group.

Each subsequent vehicle controls its distance from the vehicle driving immediately ahead. Communication between the vehicles or to a central system controller is not necessary. There may be communication to initiate actions such as stopping processes in a forward-looking or coordinated manner.

A certain gap size between the vehicles may be defined. A change in the gap size is measured as a control deviation. The distance measurement can be carried out with a first scanner, for example a route scanner. For safety reasons, the gap is mechanically closed with a flexible cover. The maximum control deviation is limited up and down.

The control superimposes the speed of the group. If the distance is too large, a catch-up speed is added and if the distance is too small, a deceleration speed is subtracted. In order to avoid escalating the control when connected to many vehicles (driving in a convoy), the control range is narrowly limited and the controller can be designed, for example, as a three-point step controller or as a P-controller.

If the gap falls below the minimum gap size, such as in the event of a traffic jam, the vehicle independently brakes to a standstill. As soon as any vehicle in the group stops due to such an emergency stop, operational stop or malfunction, the following vehicles run up and also stop independently. The vehicles in front continue to drive normally.

If the maximum gap size to the vehicle in front is exceeded (dissolution), the distance control is suspended. The vehicle drives at the speed of the group and takes on the role of the first vehicle in a group. The gap to the vehicle in front is secured by a second scanner, such as the platform scanner. The gap closes automatically when the vehicles in front stop for operational reasons. When the maximum gap size is fallen below, the distance control is automatically activated again, and the group is restored.

Separation: If the first vehicle is quickly removed from the group, the second vehicle cannot follow even with a catch-up speed. The gap becomes too large, and the second vehicle automatically takes over the control of the group with the group speed.

Docking: A new vehicle will approach the last vehicle in the group from behind at docking speed. When the maximum gap size is reached, the distance rules come into force and the group is produced. If the vehicle cannot catch up close enough to the vehicle in front within a specified docking distance, it continues to drive independently as the first vehicle of a new group at the group speed.

BRIEF DESCRIPTION OF THE DRAWINGS

Exemplary embodiments of the invention are explained below in more detail on the basis of the drawings. In the figures:

FIGS. 9-11 show in schematic side views different driving situations in group mode;

FIG. 12 shows in a schematic side view different positionings of a body on vehicles;

FIGS. 13-15 show in schematic side views different embodiments for covering a gap between two vehicles.

DESCRIPTION OF PREFERRED EXEMPLARY EMBODIMENTS

Figure 1:
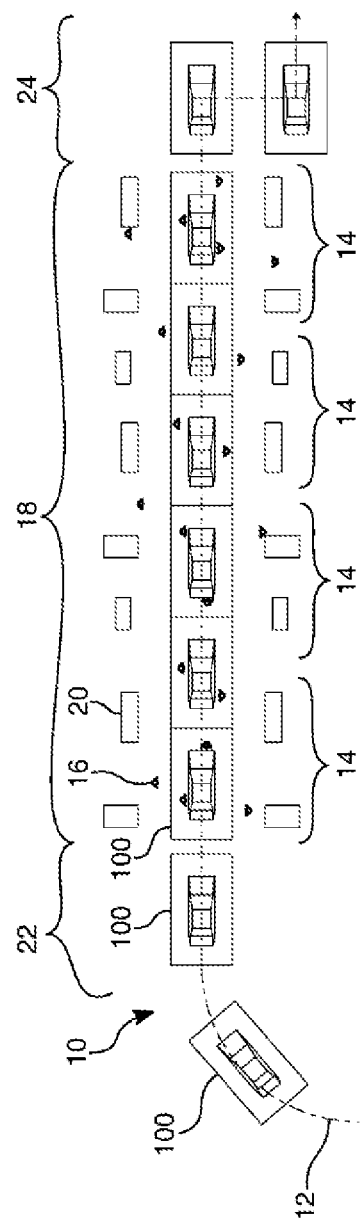
FIG. 1 shows a schematic top view of a conveyor system according to the invention, in which several vehicles in a group are approaching different processing stations or areas.

FIG. 1 illustrates in a schematic top view a conveyor system 10 according to the invention, in which several vehicles 100 are driving along a route 12 of a production line in group mode. The vehicles 100 form a group or a driving group 102 if several successive processing stations or areas 14 follow each other spatially closely or a larger processing station is approached that extends over several vehicle lengths. At the processing stations 14, workers 16 are busy next to or on the vehicles 100. The processing stations or areas 14 of FIG. 1 form an assembly line 18. At the processing stations 14, work materials or tools 20 are shown schematically.

Before entering the assembly line 18, which is traversed in a group, there is an introduction area 22, in which a single vehicle 100 is received into the group. Accordingly, an extraction area 24 is provided at the end of the assembly line 18, in which the group is dissolved again.

Figure 2:
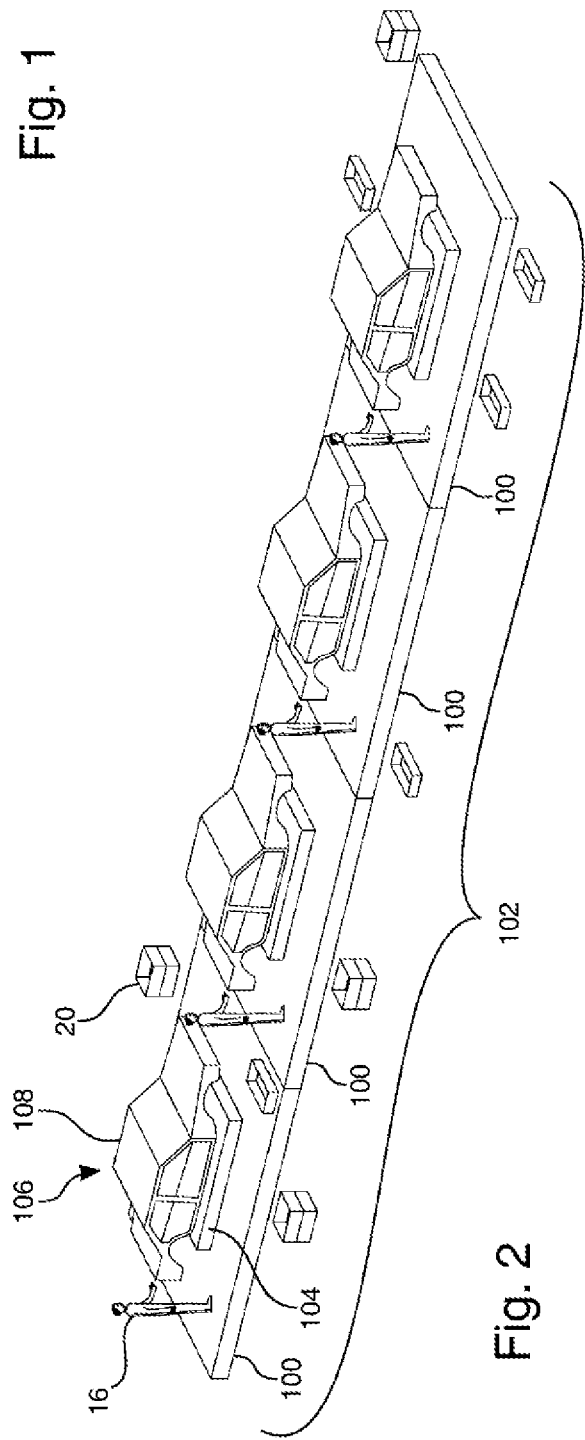
FIG. 2 shows a perspective view of the group of FIG. 1.

FIG. 2 shows in a schematic perspective view the group 102 in which several vehicles 100 are essentially connected to form a vehicle group without any gaps in between. The group 102 moves like a single vehicle 100, so to speak. Workers 16 can safely move back and forth between the vehicles 100, if desired.

Workpieces 106, here vehicle bodies 108 for example, fixed by means of workpiece holders are arranged on the vehicles 100, 104. The workpiece holders may be, for example, studs or pins 105 or carriages suitable for a vehicle body 108.

Figure 3:
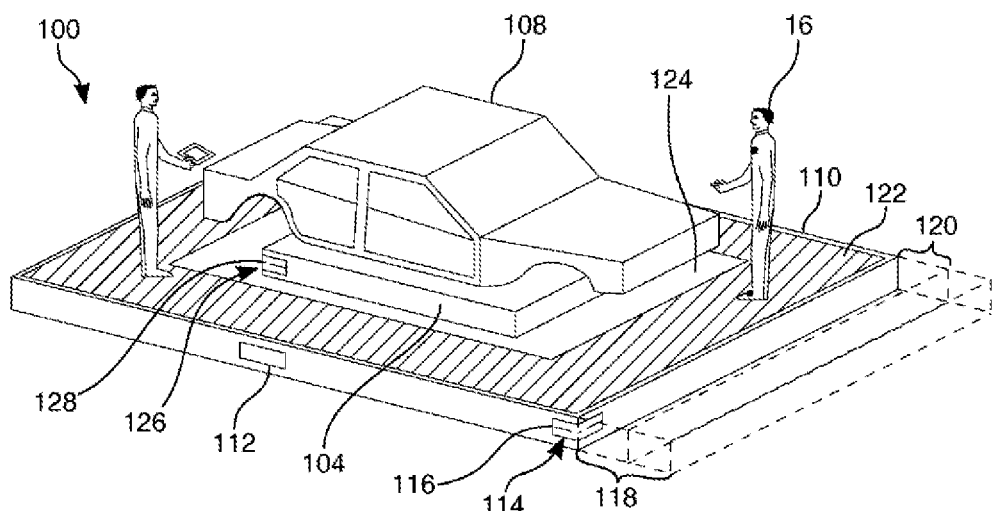
FIG. 3 shows a perspective view of a vehicle according to the invention.

FIG. 3 illustrates in a perspective view a vehicle 100 which is part of the conveyor system 10. The vehicle 100 has, as already mentioned, a workpiece holder 104, to which a workpiece to be machined 106 is attached, in this case a not yet fully assembled motor vehicle body 108. The vehicle 100 also has an assembly platform 110, which is accessible to persons such as workers 16. The vehicle 100 has a drive (not shown) that allows an omnidirectional driving manner of the vehicle 100. The vehicle 100 can therefore move in any spatial direction in the plane. In particular, longitudinal and transverse travel is possible relative to the longitudinal axis of a vehicle 100.

With regard to a specific design of such a drive, reference is made to DE 10 2017 103 931 A1, in which an exemplary drive and turning module is explained.

A control unit 112, which controls the drive of the vehicle 100 among other things, is integrated into the assembly platform 110.

The control unit 112 may include, for example, a navigation system with which the vehicle 100 can orient itself, for example, in a production hall.

The vehicle 100 also has a route sensor 114, which is implemented in the present case as a route scanner 116. The route scanner 116 is used to monitor the driving situation of the vehicle 100 as will be explained in more detail below with reference to FIG. 4. The route scanner 116 is designed in such a way that, on the one hand, while the vehicle 100 is travelling in the direction of travel, it detects the area 118 in front of the vehicle 100 and warns of a possible collision. A security region 120 is provided, which must not be fallen short of. The route scanner 116 is arranged as shown in FIG. 3 in such a way that it also detects the area 118 directly in front of the vehicle 100, which lies in the direction of travel. The route scanner can, for example, work on an optical basis—for example as a laser scanner or as a camera—or on an acoustic basis—for example as an ultrasonic sensor. The route scanner 116 can also detect areas that protrude laterally beyond the pure route area of the vehicle 100.

Figure 4:
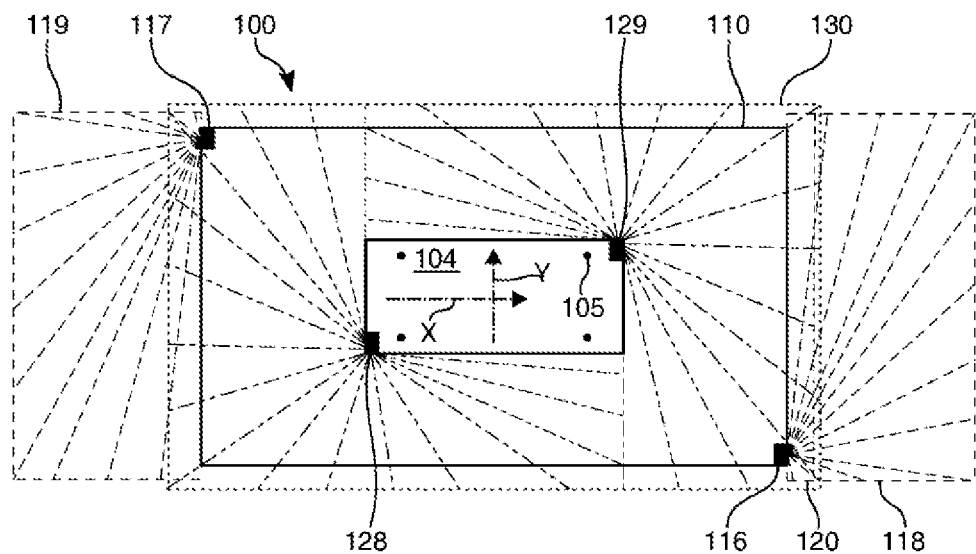
FIG. 4 shows a schematized top view of the vehicle of FIG. 3, in which the ranges of the route scanners and the platform scanners are indicated.

This is clearly illustrated in FIG. 4. FIG. 4 shows a schematic top view of the vehicle 100 without an attached workpiece 106, so that the workpiece holder 104 outline is clearly visible. Two route scanners 116, 117 are arranged on the outside of the assembly platform 110. The route scanners 116, 117 are set up in the driving situation shown in FIG. 4, in which the vehicle 100 is moving along its longitudinal axis X, so that they detect areas 118, 119, which are in front of the vehicle 100 or behind the vehicle 100 in the direction of movement X. Due to the arrangement of the route scanners 116, 117, they are also able to cover areas that are located laterally next to the direction of movement X, in order to be able to carry out collision avoidance when the vehicle moves in the transverse direction Y. As can be seen from FIG. 4, the areas 118, 119 protrude laterally next to the actual vehicle contour.

In addition to the areas 118, 119, which are designed as protective fields, warning fields may be provided that are placed in front of the protective fields.

Figure 5:
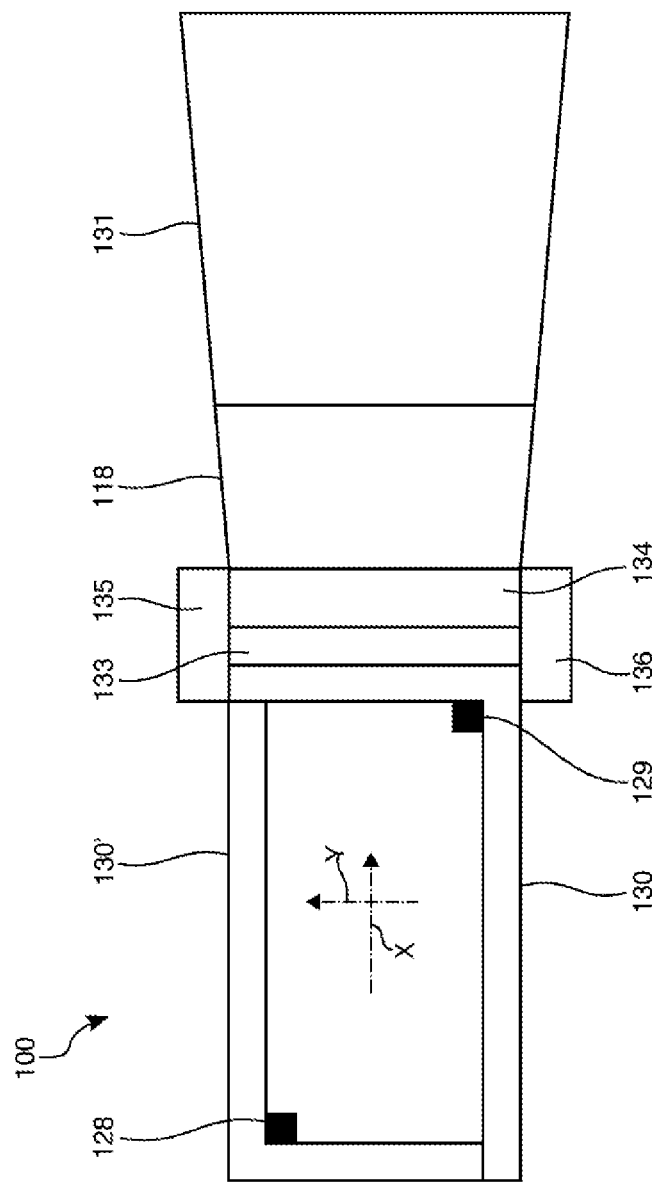
FIG. 5 shows a schematized top view of the vehicle of FIGS. 3 and 4, in which in addition to protective areas warning areas are also provided.

This is illustrated by way of example in FIG. 5. The same reference characters as in FIG. 4 are used for the same or comparable features. The vehicle 100 has such a warning field 131 in addition to the areas 118, 119—in FIG. 5, for the sake of clarity, only one area 118 is activated as a protective field, for example for forward travel in the X direction. The warning field 131 is by way of example upstream of the area 118 and can be used for an adjustment of the speed and the extent of the protective field 118 and the warning field 131 as described above. Furthermore, further areas or fields, which are also monitored and defined by the platform scanner 128, are arranged upstream of the additional areas 130, 130', which are monitored by the platform scanner 128, 129. The same fields could be formed as a mirror image on the side of the other platform scanner 128 and monitored.

Two fields 133, 134 are arranged one after the other directly upstream in the direction of travel X. The fields 135, 135 are arranged laterally upstream of the fields 133, 134. Furthermore, seen in the direction of travel X, the field 134 is adjoined by the fields or areas 118, 131, which open at an angle of 10°.

While the warning field 131 is permanently formed as a warning field 131, the other fields 118, 133-136 can be used in phases as a protective field or as a warning field.

The adjustment of the speed of the vehicle 100 and the change of the individual fields as a warning or protective field can be carried out, for example, according to the following scheme:

| Driving speed: | 60 m/min | 30 m/min | 15 m/min | 6 m/min |
|---|---|---|---|---|
| Definition „s" | Emergency stop | Emergency stop | Emergency stop | Emergency stop |
| Definition „w" | Warning field >30 m/min | Warning field >15 m/min | Warning field >6 m/min | |
| Direction of travel 0° to 5°: | | | | |
| Field assignment | s: 130, 130', 133, 134, 118 w: 131 | s: 130, 130', 133, 134 w: 118 | s: 130, 130', 133 w: 134 | s: 130, 130' |
| Direction of travel forward. 5° to 30° | | | | |
| Field assignment | n. a. | s: 130, 130', 133, 134, 135/136 w: 118 | s: 130, 130', 133 w: 134, 135/136 | s: 130, 130' |

The table above shows how the various fields can be successively redefined and, if necessary, even switched off.

As shown in FIG. 3, the assembly platform 10 has a walk-on area 122. This represents the area within which workers 16 can move safely on the platform and thus represents a safe area. The walk-on area 122 is demarcated from a restricted area 124. Access of workers 16 in the restricted area 124 is intended to take place. For monitoring the assembly platform 110 and in particular the walk-on area 122 and the restricted area 124, contactless platform sensors 126 in the form of platform scanners 128, 129 are provided.

As can be seen from FIG. 4, in the exemplary embodiment shown there two platform scanners 128, 129 cover the entire area of the assembly platform 110 not occupied by the workpiece holder 104. In addition, it may be provided that the area covered by the platform scanners 128, 129 extends beyond the actual area of the platform 110 and thus covers an additional area 130. It is preferred if this additional area 130 intersects at least partially with the safety area 120 of the route scanners 116, 117 and particularly preferably extends beyond it with regard to its extent along the assembly platform 110. This is shown by way of example in FIG. 4. There, the additional area 130 of the platform scanner 129 overlaps the safety area 120 of the route scanner 116.

The platform scanners and route scanners 128, 129 are mounted on the assembly platform 110 and detect in the embodiment shown in FIGS. 3 and 4 an area on or slightly above the assembly platform 110, but not areas below a plane formed by the top of the assembly platform 110. On the one hand, this is due to the fact that the platform scanners 129, 128 are mounted inside the restricted area 124 of the assembly platform 110 and are thus mounted set back from the edge of the assembly platform 110. Alternatively or additionally, one or more platform scanners may be mounted on the edge of the assembly platform 110, for example at the corners like the route scanners 116, 117 and thus open up the possibility of monitoring areas around the assembly platform 110 that are located below the top of the assembly platform 110.

In the embodiment shown in FIGS. 3 and 4, the route scanners 116, 117 and the platform scanners 128, 129 accordingly deliver signals or information to the control unit 112 and thus enable a largely autonomous, at least driverless driving of the vehicle 100. The vehicle 100 can thus avoid collisions by means of the route scanners 116, 117 and at the same time can monitor the assembly platform 110 by means of the platform scanners 128, 129 in the driving and stationary modes.

Figure 6:
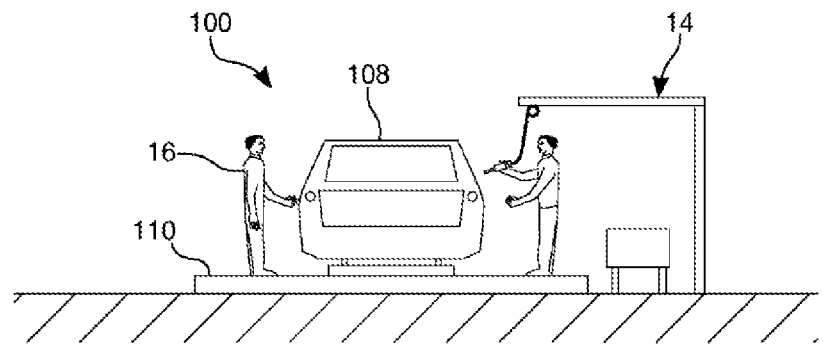
FIGS. 6-8 shows schematic views of different types of processing stations.
Figure 7:
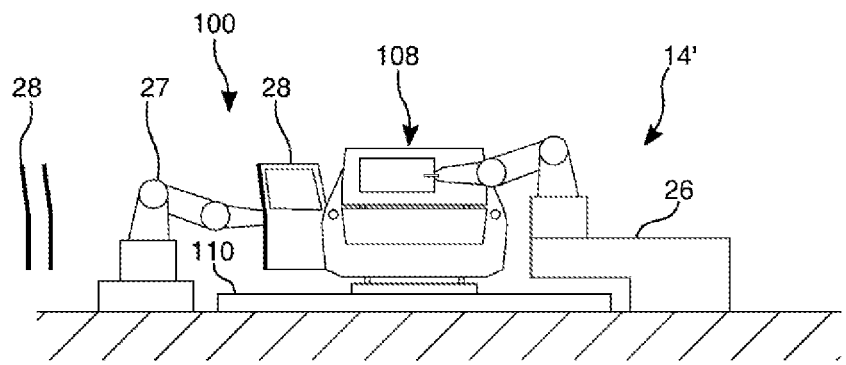
Figure 8:
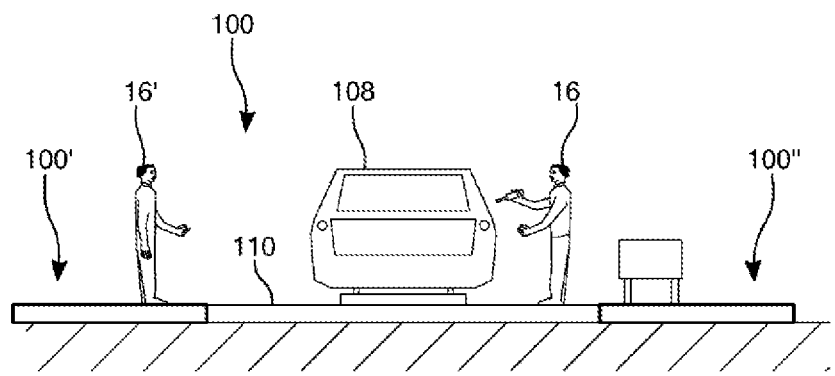

FIGS. 6-8 show different operating situations of a vehicle 100. In the situation shown in FIG. 6, the assembly platform 110 of the vehicle 100 serves to provide a movable working platform for workers 16 who have to perform work on a vehicle body 108. For example, it may be provided that the workers together with the assembly platform 110 move to the processing station 14 symbolically shown in FIG. 6, carry out manual work there during a stop and then move further with the assembly platform 110. Alternatively or additionally, it may be provided that the workers 16 only enter the assembly platform 110 after the vehicle 100 reaches the processing station 14, carry out manual activities and leave the assembly platform after completion. Here, for example, it may be the task of vehicle scanners 116, 117 to ensure a collision-free journey when approaching and leaving the processing station 14. The platform scanners 128, 129, on the other hand, can, for example, ensure that possibly restricted areas of the platform 110 are not entered or that the correct, i.e. for example, the correctly qualified, or the right number of workers 16 are on the platform 110.

FIG. 7 illustrates a different situation. In the processing station 14' shown in FIG. 7, no workers are working on the vehicle body 108, but automatically working robots 26, 27 are working and carrying out assembly activities by way of example. For example, the robot 27 shown on the left is attaching vehicle doors 28. With this processing station 14', for example, the vehicle scanners 116, 117 and the platform scanners 128, 129 must ensure that no worker approaches the assembly platform, enters it or is on the assembly platform 110 during the approach, since the operating area of the robots 26, 27 is located on otherwise freely accessible areas of the assembly platform 110 or parts of the robots, for example, the robot 26, even protrude far beyond the assembly platform 110.

FIG. 8 illustrates another application situation. A vehicle 100 is transporting a workpiece in the form of a vehicle body 108 on an assembly platform 110. The assembly platform 110 can be entered by a worker 16, who can then carry out activities on the vehicle body 108, for example. There are further vehicles 100' and 100" arranged laterally next to the vehicle 100. For example, the second vehicle 100' located on one side of the vehicle 100 can convey a worker 16' or serve as a side platform that can be walked on. A third vehicle 100" can, for example, also be arranged next to the vehicle 100 and serve for conveying or transporting materials or tools. Due the assembly platforms that the respective vehicle offers 100, 100', 100" being at the same level, the workers 16, 16' can move freely with the vehicles at a standstill or during group travel.

At the same time, the route scanners 116, 117 and the platform scanner 128, 129 can be used to enable the vehicles 100, 100', 100" to approach each other and move away from each other and to signal safe accessibility in the event of a relative standstill of the vehicles in relation to each other. This can be signaled, for example, by visual or acoustic signals for the workers 16, 16'. Alternatively or additionally, it may also be possible that blocking devices are provided on the assembly platforms 110, which are released when there is safe access.

FIGS. 9-11 show different driving situations with at least two vehicles. In FIG. 9, at least two vehicles 100, 100' form a vehicle group or a group 102 and move at a common speed. A third vehicle 200 has the same speed and thus maintains contact with the vehicle group 102 and is therefore part of it. The workers on the assembly platforms 110, 110',210 can in principle move freely on the assembly platforms within the specified walk-on areas. Each of the vehicles 100, 100', 200 has a route scanner 116, 116', 216, which is used in the driving situation present in FIG. 9 to keep the distance of a vehicle from the vehicle in front within certain limits. It can thus be ensured that, for example, the distance 232 between two assembly platforms 110, 210 never becomes greater than a certain maximum safety distance of, for example, 20 or 50 mm. At the same time, this safety distance 232 can be used to compensate for minor speed differences or, even if direction adjustments are necessary, to facilitate or enable driving maneuvers by adjusting the actual distance.

FIG. 10 illustrates the approach process of a vehicle 200—in the exemplary embodiment shown loaded with a vehicle body 208 as a workpiece—to a group 102 which is formed of two vehicles 100, 100'. In the driving situation shown in FIG. 10, the group 102 is moving at a first speed, while the approaching vehicle 200 has a greater speed. Alternatively, the group 102 could also be at rest and the vehicle 200 could approach accordingly. As long as the distance between the approaching vehicle 200 and the rearmost vehicle 100 in the group 102 is large enough, as shown in FIG. 10, the route sensor 216 is used to control this distance and thus also the relative speed. At the same time, the route sensor in the form of the vehicle scanner 216 is used to monitor the gap 132 between the vehicles for possible collisions. The gap 132 represents a special hazard feature for operators such as workers 16 and must be monitored continuously, especially during an approach process.

FIG. 11 shows the situation in which the vehicle 200 approaching the group 102 is within the safety distance defined by the route scanner 216. Its collision monitoring is inactive in this driving situation. In this driving situation, the platform scanner 229 of the approaching vehicle 200 takes over the task of collision monitoring of the gap 232 for the case in which the gap 232 cannot be covered by other mechanical devices, wherein the platform scanner 229 can carry out the monitoring of the gap 232 continuously. Otherwise, it takes over the monitoring until the gap 132 is covered. This monitoring can always take place if a gap 132 is created during a maneuver—i.e. when the driving situation changes—which represents a possible danger for the operating personnel, for example for the workers 16.

FIG. 12 illustrates the possibility of dynamically adjusting the range of the platform scanners 128. While the vehicle 100 shown in the left situation in FIG. 12 has the vehicle body 108 on an elevated workpiece holder 104, the vehicle body 108' on the vehicle 100' shown on the right in FIG. 12 is lower. For example, the workpiece holder 104 may have a lifting device, optionally also a turning device. Depending on the requirements, for example, the platform scanner 128 of the left vehicle 100 can be set so that it is possible for the worker 16 to also work below the vehicle body 108 and thus to increase the walk-on area 122, whereas it may be necessary at higher speeds and with possible pitching or tilting movements of the vehicle 104 to conversely reduce the walk-on area 122 to such an extent that there is no danger to the workers 16 in the event of such movements.

FIGS. 13-15 illustrate various embodiments for the mechanical covering of the gaps or the distance 132. FIGS. 13-15 each show an assembly platform 210 in the upper image which is approaching an assembly platform 110 of a vehicle in front. In the upper image, the approach process is in progress, in the lower image it is completed. FIG. 13 shows elastic elements 140, 240 attached to the ends of the assembly platforms 110, 210. Once the approach process is completed, the gap 102 is minimized, the elastic elements are in contact and, depending on the design, are slightly compressed. Electrical contacts can also be closed by the contact of the elastic elements 140, 240, and then emit a corresponding signal to the control unit 112.

In the illustrations of FIG. 14, the closure or covering elements are implemented as sliding elements 142, for example sliding plates. FIG. 15 shows folding elements, such as folding plates, which serve as covers. Both the sliding elements 142, 242 and the folding elements 144, 244 are mounted on the end in the embodiment shown and can also serve as elements which can trigger an electrical signal on contact. All the closure elements shown can be designed in such a way that access is not problematic for a worker 16, so that a common walk-on level is created, which is formed across assembly platforms or vehicles.

FIGS. 16-20 show various movement possibilities of a vehicle 100 when approaching a vehicle group or when detaching from a vehicle group.

Figure 16:
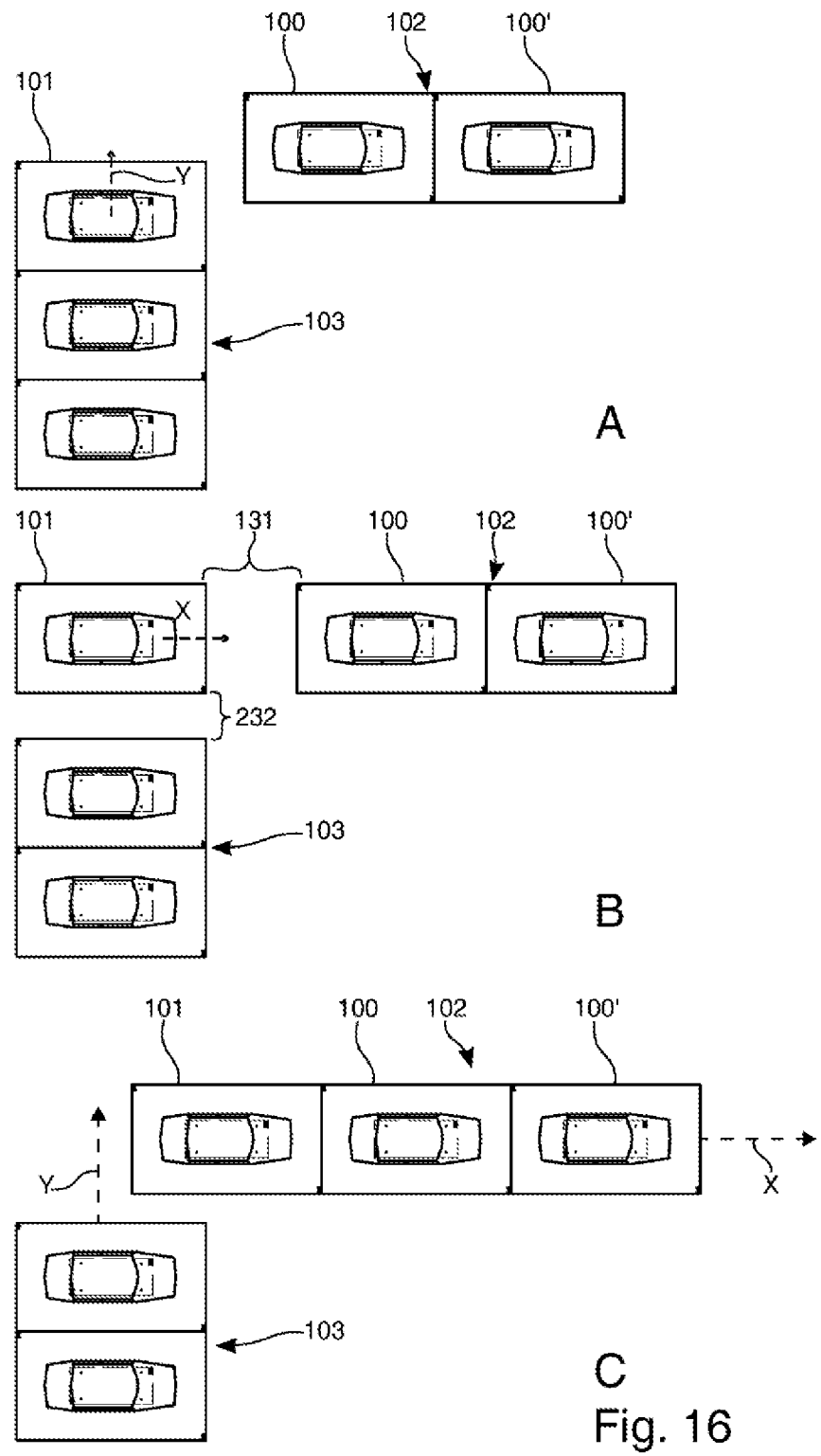

FIG. 16 shows in three representations A, B, C in this order the detachment of a vehicle 101 from a vehicle group or a group 103 and its attachment to a vehicle group or a group 102, consisting of two vehicles 100, 100'. In order to detach the vehicle 101 from the vehicle group 103, acceleration of the vehicle 101 along a direction Y is to be carried out in order to create a distance 232 between the vehicle 101 and the remaining residual vehicle group 103. In order to subsequently connect the vehicle 101 to the vehicle group 102, braking of the vehicle 101 in the Y direction is to be carried out until a final standstill in that direction, and then an acceleration of the vehicle in the X direction corresponding to the direction of movement of the vehicle group 102 is to be carried out. This acceleration is shown in image B. Upon reaching the vehicle group 102, a further acceleration, namely braking to the vehicle group speed, is necessary. Image C shows the newly formed vehicle group 102, consisting of vehicles 101, 100, 100', which moves at a common speed along the direction of movement X. At the same time, the vehicle group 103 is depicted, which continues to move at undiminished speed in the Y direction. As can be seen from this illustration, the movement of vehicles 101 only along two mutually perpendicular axes is complex in terms of control and the required motion sequences. Multiple accelerations in different directions of movement are necessary.

The illustrations in FIG. 17 again show a sequence of movements in three images A, B, C, which reaches the same final situation starting from the same starting position. Here, however, the fact that the vehicle 101 is equipped with an omnidirectional chassis is used. This allows the vehicle 101 to accelerate along a direction of movement 150 and to move along it. This direction of movement 150 immediately creates a distance 232 which is required between the vehicle 101 and the remaining vehicle group 103. At the same time, the direction of movement 150 immediately reduces the distance 132 that exists between the vehicle 101 and the destination vehicle group 102. Thus, the transition from a vehicle group 103 to the second vehicle group 102 can take place with a single acceleration to reach the destination vehicle group 102 (and a subsequent braking to the vehicle group speed).

Figure 17:
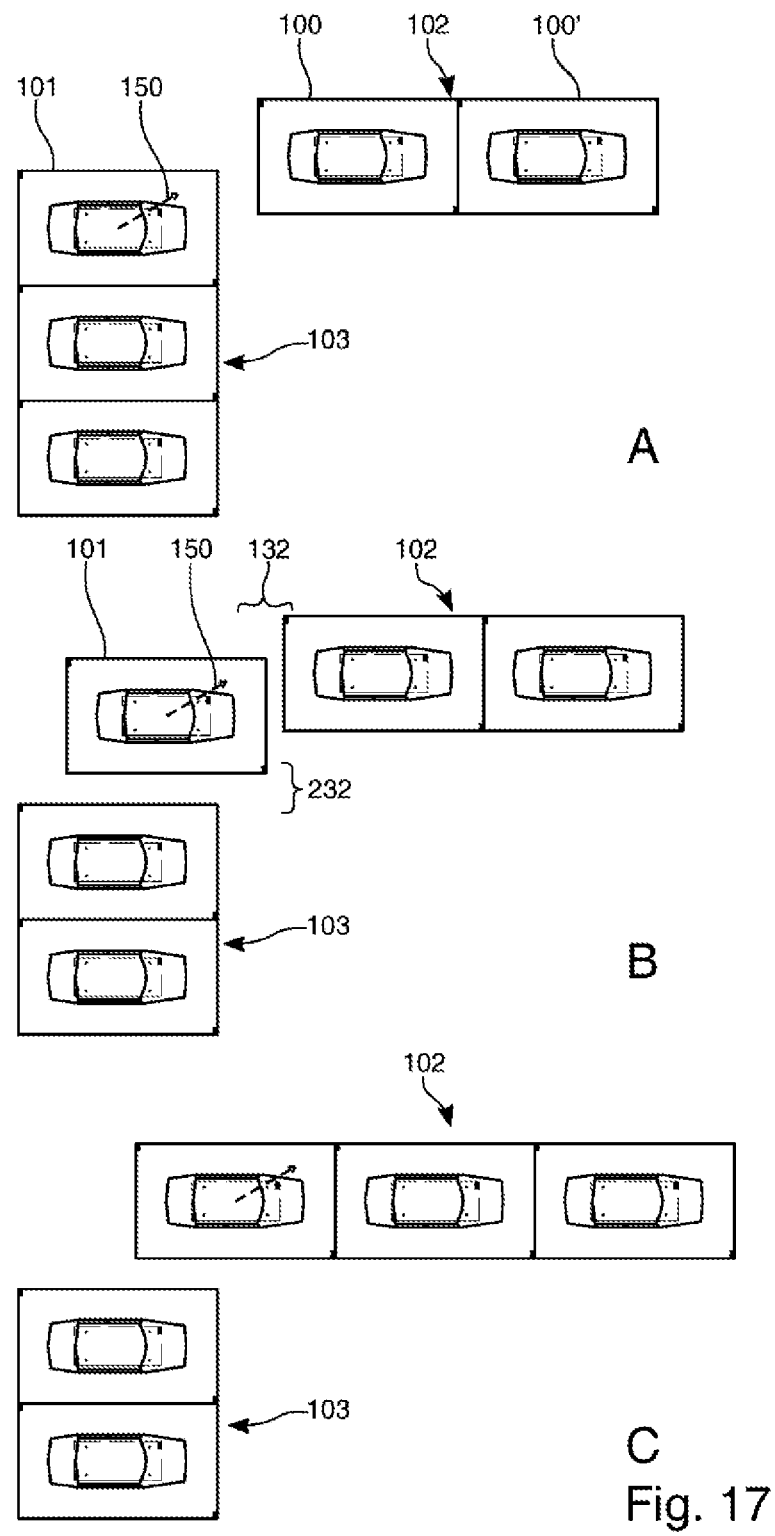
FIGS. 17-20 show in schematic top views different forms of movement of vehicles in group mode.
Figure 18:
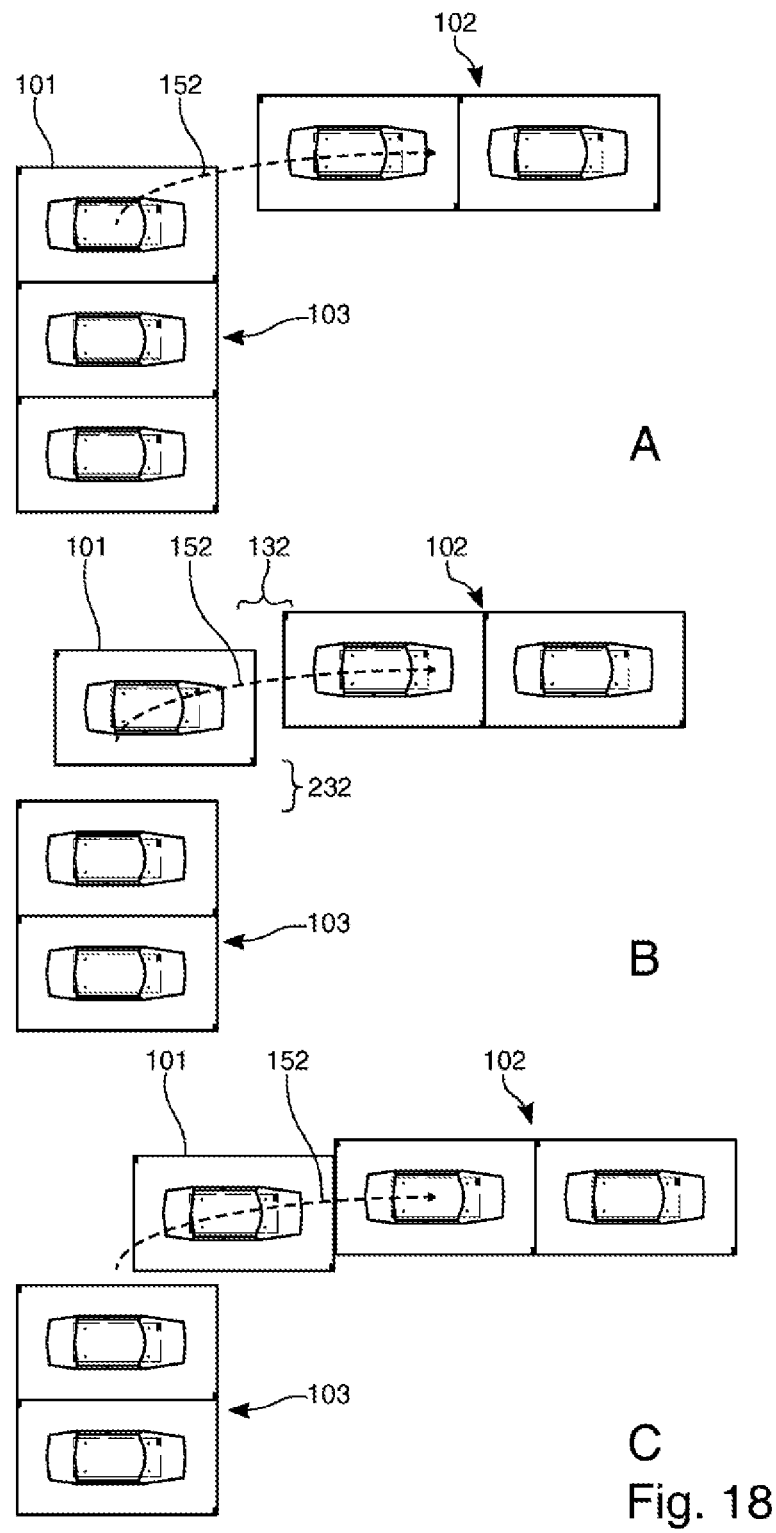

In the illustrations of FIG. 18, in the same way as in the preceding embodiments of FIGS. 16 and 17 in three images A, B, C, a transfer situation from a vehicle group 103 to a second vehicle group 102 is shown. In contrast to FIG. 17, a route 152 for the transferring vehicle 101 is provided which is not linear. Rather, the route 152 is a curve that initially allows a rapid enlargement of the gap 232 between the remaining vehicle group 103 and the vehicle 101 to be transferred. After a short time along the route 152, the gap 132 between the destination vehicle group 102 and the vehicle 101 to be transferred is closed. The exact parallel alignment of the vehicle 101 to the connecting vehicle group 102 can be carried out in the further course of the route 152 even after closing the gap 132 (as shown in figure C).

Figure 19:
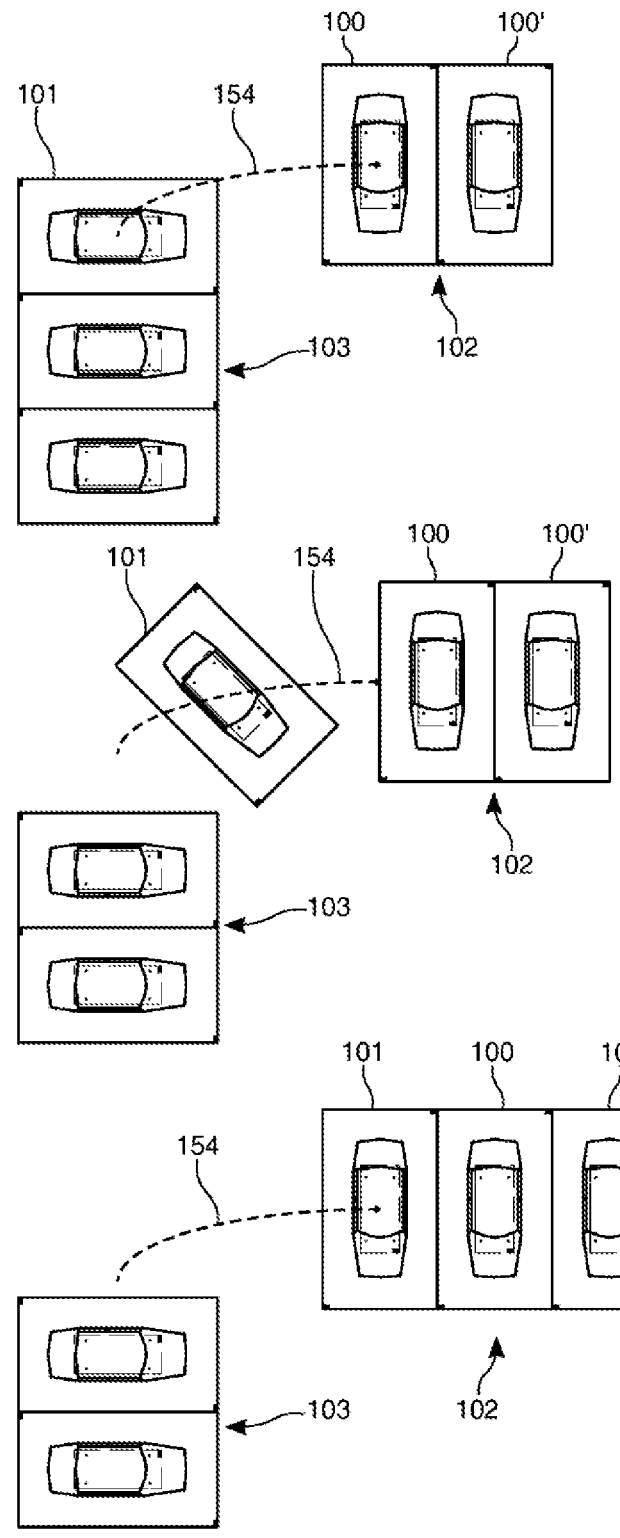

FIG. 19 also shows in three illustrations a transfer process very comparable to FIG. 18 of a vehicle 101 from a group 103 to a second group 102. The path described by the center of gravity of the vehicle 101 is very similar to the path 152 of FIG. 18. In contrast, however, a simultaneous rotation of the vehicle 101 takes place in the path 154 of FIG. 19. On the path 154 shown in the exemplary embodiment of FIG. 19, when viewed from above the vehicle 101 rotates by 90° and thus joins the orientation of the vehicles 100, 100' of the group 102.

Figure 20:
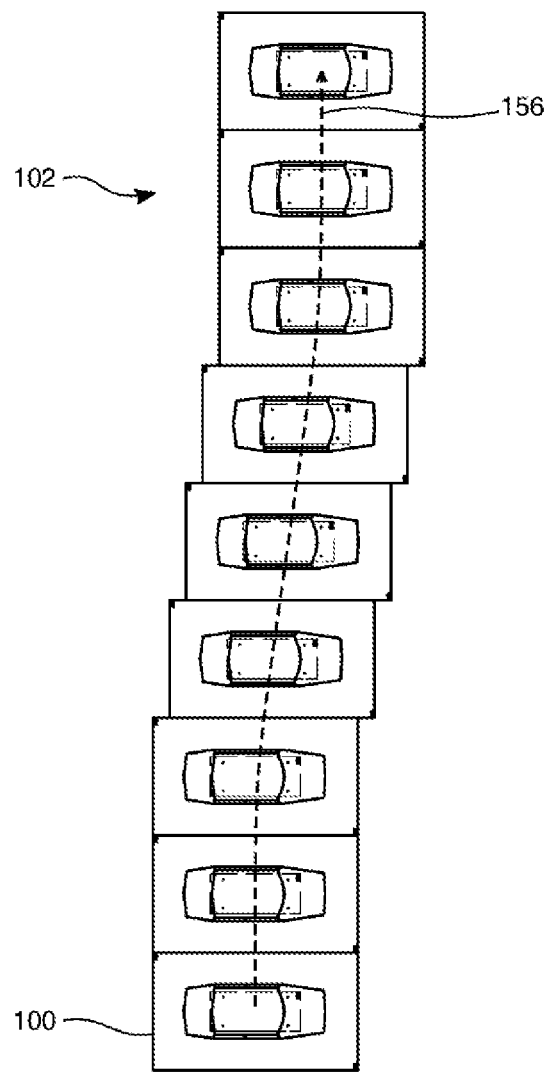

FIG. 20 clearly shows a vehicle group 102 in which a lateral offset of the individual vehicles 100 takes place along a route 156.

What is claimed is:

1. A vehicle for a conveyor system for the simultaneous transport of workpieces and workers, the vehicle comprising:

a) a workpiece holder;
b) an assembly platform accessible to workers;

c) a dedicated drive which is set up to drive the vehicle independently of other vehicles of the conveyor system;
d) a contactless route sensor for monitoring a driving situation of the vehicle within a safety distance; and
e) a control device for controlling the drive depending on a signal from the contactless route sensor, wherein
f) the vehicle has a contactless platform sensor for monitoring the assembly platform, wherein the contactless platform sensor is set up to monitor an additional area located beyond the assembly platform to allow for the platform sensor to alternatively take over the monitoring of the driving situation of the vehicle at least temporarily, or additionally support the monitoring of the driving situation of the vehicle at least temporarily.

2. The vehicle as claimed in claim 1, wherein the takeover or the support are carried out on falling below the safety distance.

3. The vehicle as claimed in claim 1, wherein the monitoring of the driving situation includes collision avoidance.

4. The vehicle as claimed in claim 1, wherein the contactless platform sensor is set up to adjust its range dynamically or in stages.

5. The vehicle as claimed in claim 1, wherein the contactless route sensor and the contactless platform sensor work in the horizontal.

6. The vehicle as claimed in claim 1, wherein the detection space of the contactless platform sensor can be set up so that it extends beyond the assembly platform by a safety distance.

7. The vehicle as claimed in claim 1, wherein the contactless platform sensor covers an area above the contactless route sensor.

8. A conveyor system with at least two vehicles according to claim 1.

9. A method for controlling a vehicle comprising the steps of:
providing a workpiece holder, an assembly platform accessible to workers, a dedicated drive set up to drive the vehicle independently of other vehicles of the conveyor system, a contactless route sensor for monitoring a driving situation of the vehicle within a safety distance, a control device for controlling the drive depending on a signal from the route sensor, and a contactless platform sensor for monitoring the assembly platform and an additional area located beyond the assembly platform;
monitoring the driving situation of the vehicle with the contactless route sensor;
approaching a second vehicle to form a group, moving away from a second vehicle for detachment from a group or an approach of the vehicle to a moving or stationary interfering contour;
once the safety distance from the second vehicle or the interfering contour is fallen below or as long as the second vehicle or the fault contour is within the safety distance, alternatively or additionally carrying out monitoring of the driving situation with the contactless platform sensor.

10. The method as claimed in claim 9, wherein the monitoring of the driving situation includes collision avoidance, in particular for personal protection.

11. The method as claimed in claim 9, wherein the contactless platform sensor adjusts its range dynamically or in stages during an approach or while moving away.

12. The method as claimed in claim 9, wherein in a group, the contactless route sensor takes over control of the distance from a second vehicle.

13. The method as claimed in claim 9, wherein the contactless platform sensor takes over the monitoring of the assembly platform and a docking area to the second vehicle.

14. The method as claimed in claim 9, wherein the area detected by the contactless route sensor or/and the contactless platform sensor depends on the current driving speed, the position, the load state of one vehicle and/or the distance from another vehicle.

* * * * *